(12) United States Patent
Fabbricante et al.

(10) Patent No.: US 7,901,195 B2
(45) Date of Patent: Mar. 8, 2011

(54) ATTENUATED FIBER SPINNING APPARATUS

(75) Inventors: Anthony Fabbricante, Oyster Bay, NY (US); Jack S. Fabbricante, Medford, NY (US); Thomas J. Fabbricante, Lynbrook, NY (US)

(73) Assignee: SpinDynamics, Inc., Oyster Bay, NY (US)

( * ) Notice: Subject to any disclaimer, the term of this patent is extended or adjusted under 35 U.S.C. 154(b) by 134 days.

(21) Appl. No.: 11/867,759

(22) Filed: Oct. 5, 2007

(65) Prior Publication Data
US 2009/0091056 A1 Apr. 9, 2009

(51) Int. Cl.
*B29C 47/30* (2006.01)

(52) U.S. Cl. .................. 425/72.2; 425/378.2; 425/382.2

(58) Field of Classification Search .................. 425/72.2, 425/378.2, 382.2, 464, DIG. 49
See application file for complete search history.

(56) References Cited

U.S. PATENT DOCUMENTS

| 2,998,620 | A | | 9/1961 | Stalego |
|---|---|---|---|---|
| 3,192,562 | A | * | 7/1965 | Powell ........................ 425/131.5 |
| 3,849,241 | A | | 11/1974 | Butlin |
| 4,380,570 | A | | 4/1983 | Schwarz |
| 5,476,616 | A | | 12/1995 | Schwarz |
| 5,562,930 | A | * | 10/1996 | Hills .............................. 425/198 |
| 5,645,790 | A | | 7/1997 | Schwarz |
| 5,679,379 | A | | 10/1997 | Fabbricante |
| 5,785,996 | A | | 7/1998 | Snyder |
| 6,114,017 | A | | 9/2000 | Fabbricante |
| 7,033,153 | B2 | | 4/2006 | Allen |
| 2008/0136054 | A1 | * | 6/2008 | Fabbricante et al. ...... 264/211.1 |

* cited by examiner

*Primary Examiner* — Joseph S Del Sole
*Assistant Examiner* — James Sanders
(74) *Attorney, Agent, or Firm* — George W. Moxon, II; Moxon & Associates

(57) ABSTRACT

A fiber making device, fiber making method, and apparatus which incorporates a series of two or more stacked, thin circular die plates, two end plates and two enclosure plates, where all of the plates cooperate to form a chamber having opposite ends and define a first end and a second end. The first end will receive material to be formed into fibers and the second end will receive a fiberizing fluid, although the second end could be used to supply a second fiber forming fluid to form composite fibers. All of the die plates have a central opening to receive fiber forming material, and at least one of the die plates has an outflow edge peripheral to the plate which will define a spinneret orifice, which is in fluid communication with said central opening, and which will allow the flow of material along a radial path through which fibers can be extruded. At least one of the die plates has an outflow edge peripheral to the plate which will define an opening and allow for the flow of a fiberizing fluid from the opening so that the fiber forming material flowing from the spinneret orifice will form fibers which will be engaged and shaped by the fiberizing fluid.

21 Claims, 17 Drawing Sheets

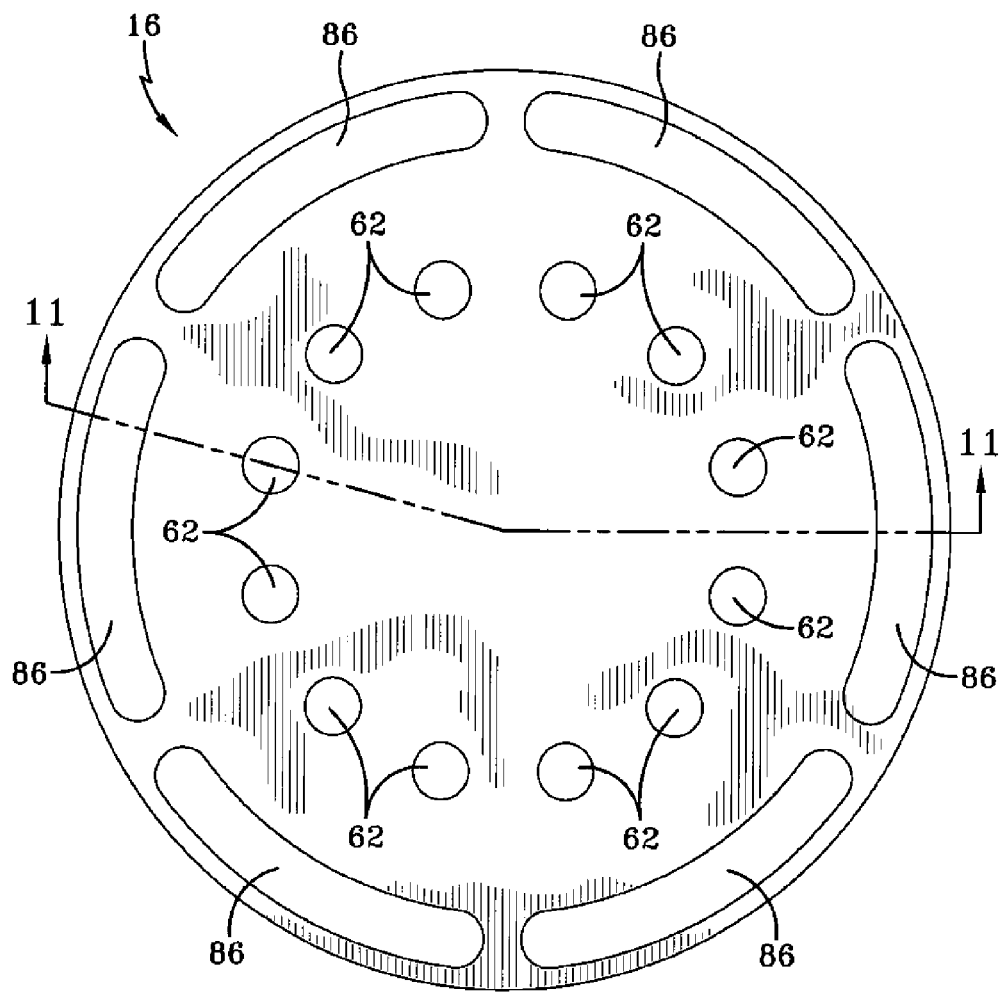
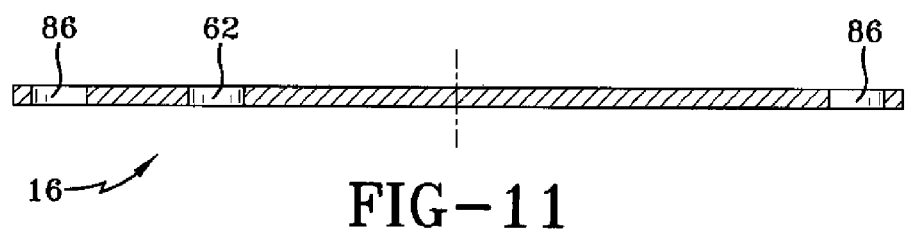
FIG-10
FIG-11

ATTENUATED FIBER SPINNING APPARATUS

BACKGROUND OF THE INVENTION

This invention relates to a method and an apparatus for spinning fibers, or fiberizers, using a rotary fiber-making die system made up of thin plates, embodied by a housing fixture, configured and stacked to define slots, channels and/or grooves through which the material used to make the fibers will flow. The die system allows for the production of different size and types of fibers, including nanofibers having a diameter of less than 1 micron, and facilitates a variety of cost effective methods for extrusion. The use of plates means the dies can be manufactured cost effectively, with easier cleanouts, replacements and/or variations.

Thermoplastic resins and glass have been extruded to form fibers and webs for many years. The nonwoven webs produced are commercially useful for many applications including diapers, feminine hygiene products, medical and protective garments, filters, geotextiles, insulation, ceiling tiles, battery separator media and the like. Larger glass-type fibers have been utilized in applications such as acoustical or thermal insulation materials. The common prior art methods for producing glass fiber insulation products involve producing glass fibers from a rotary process. A single molten glass composition is forced through the orifices in the outer wall of a centrifuge or spinner, producing primarily straight glass fibers. Curly glass fibers as taught in U.S. Pat. No. 2,998,620 to Stalego, which is incorporated herein by reference, discloses a bi-component glass composition to effect the curly end product.

A highly desirable characteristic of the fiber used to make nonwoven webs for certain applications is that they be as fine as possible, in some cases where fibers less than 1 micron are required. Fibers with small diameters, less than 10 microns, result in improved coverage with higher opacity. Small diameter fibers are also desirable since they permit the use of lower basis weights or grams per square meter of nonwoven. Lower basis weight, in turn, reduces the cost of products made from nonwovens. In filtration applications small diameter fibers create correspondingly small pores which increase the filtration efficiency of the nonwoven.

The most common of the polymer-to-nonwoven processes are the well known spunbond and meltblown processes. Some of the common principles between these two processes are the use of thermoplastic polymers extruded at high temperatures through small orifices to form filaments, using air to elongate the filaments and transport them to a moving collector screen where the fibers are coalesced into a fibrous web or nonwoven. The process chosen depends on the starting material and/or on the desired properties/applications of the resultant fibers.

In the typical spunbond process the fiber is substantially continuous in length and has a fiber diameter in the range of 20 to 80 microns. The meltblow process typically produces short, discontinuous fibers that have a fiber diameter of 2 to 6 microns.

Commercial meltblown processes as taught by U.S. Pat. No. 3,849,241, incorporated herein by reference, to Butin, et al., use polymer flows of 1 to 3 grams per hole per minute at extrusion pressures from 400 to 1000 psig and heated high velocity air streams developed from an air pressure source of 60 or more psig to elongate and fragment the extruded fiber. The typical meltblown die directs air flow from two opposed nozzles situated adjacent to the orifice such that they meet at an acute angle at a fixed distance below the polymer orifice exit. Depending on the air pressure and velocity and the polymer flow rate the resultant fibers can be discontinuous or substantially discontinuous.

U.S. Pat. Nos. 4,380,570, 5,476,616 and 5,645,790, incorporated herein by reference, all further detail the melt blowing process. More particularly, they detail improvements to melt blown spinnerettes counted on the surfaces of a polygonal melt-blowing extrusion die block thereby spinning fibers away from the center of the polygon at high extrusion rates. The fibers being deflected about 90 degrees by an air stream from a circular or polygonal air ring to enhance fiber entanglement and web formation.

Nonwoven webs as taught by Fabbricante et al. U.S Pat. No. 6,114,017, which is incorporated. herein by reference, are made by a meltblown process where the material is extruded through modular dies. The patent utilizes a series of stacked plates, each containing one or more rows of die tips. Each modular area being attached to a forced air mechanism to effect an extrusion. This produces a unique nonwoven web similar to Fabbricante et al. U.S. Pat. No. 5,679,379, which is incorporated herein by reference and which details an embodiment of die plates for fiber extrusion. Advantages mentioned by the modular die extrusion method being the efficiency of a quick change if a die became clogged or of using a lower cost material to effect a cost advantageous rapid cleanout/changeout.

Melt spinning techniques, such as spunbonding or meltblowing techniques, for extruding fine diameter filaments find many different applications in various industries including, for example, in nonwoven material manufacturing. This technology generally involves extruding a thermoplastic material from multiple rows of discharge outlets extending along the lower surface of an elongate spinneret. Spunbonded and/or meltblown materials are used in such products as diapers, surgical gowns, carpet backings, filters and many other consumer and industrial products. The machines for meltspinning such materials can be very large and include numerous filament discharge outlets.

For certain applications, it is desirable to utilize two or more types of thermoplastic liquid materials to form individual cross-sectional portions of each filament. Often, these multi-component filaments comprise two components and, therefore, are referred to as bicomponent filaments. For example, when manufacturing nonwoven materials for use in the garment industry, it may be desirable to produce bicomponent filaments having a sheath-core construction. The outer sheath may be formed from a softer material which is comfortable to the skin of an individual and the inner core may be formed from a stronger, but perhaps less comfortable material having greater tensile strength to provide durability to the garment. Another important consideration involves cost of the material. For example, a core of inexpensive material may be combined with a sheath of more expensive material. For example, the core may be formed from polypropylene or nylon and the sheath may be formed from a polyester or co-polyester. Many other multi-component fiber configurations exist, including side-by-side, tipped, bicomponent, and microdenier configurations, each having its own special applications. Various material properties can be controlled using one or more of the component liquids. These include, as examples, thermal, chemical, electrical, optical, fragrance, and anti-microbial properties. Likewise, many types of die tips exist for combining the multiple liquid components just prior to discharge or extrusion to produce filaments of the desired cross-sectional configuration.

One problem associated with multi-component extrusion apparatus involves the cost and complexity of the manifolds used to transmit liquid(s) to the spinneret or extrusion die. Typical manifolds are typically machined with many different passages to ensure that the proper flow of each component liquid reaches the die under the proper pressure and temperature conditions. These manifolds are therefore relatively complex and expensive components of the melt spinning apparatus.

U.S. Pat. No. 7,033,153 to Allen et al. teaches a meltblowing apparatus having a manifold system which consists of a stack of plates and which may be easily manufactured while effectively transmitting heated liquid or liquids to the die tip. It includes a lamellar die apparatus for extruding a heated liquid into filaments and directing air at the filaments, and includes a plurality of plates each having opposite side faces which provide a liquid passage and an air passage for transferring the air. At least two of the side faces confront each other and have a heating element passage therebetween.

Conventional melt spinning processes involve molten materials (typically a polymer and/or glass) being gravity fed or pumped under pressure to a spinning head and extruded from spinneret orifices into a multiplicity of continuous fibers. Melt spinning is only available for polymers (not including glass) having a melting point temperature less than its decomposition point temperature, such as nylon, polypropylene and the like whereby the polymer material can be melted and extruded to fiber form without decomposing. Other polymers, such as acrylics, cannot be melted without blackening and decomposing. Such polymers can be dissolved in a suitable solvent of typically 20% polymer and 80% solvent In a wet solution spinning process, the solution is pumped, at room temperature, through the spinneret which is submerged in a bath of liquid (e.g. water) in which the solvent is soluble to solidify the polymeric fibers. It is also possible to dry spin the fibers into hot air, rather than a liquid bath, to evaporate the solvent and form a skin that coagulates. Other common spinning techniques are well known and do not form a critical part of the instant inventive concepts.

The area of fiber spinning frequently involved a spinneret made from a solid metal which is extrusion die cast or drilled to create openings or orifices from which the fibers are extruded. This presents limited options in the fiber spinning area due to a limitation on distribution/flow paths. A typical spinning method is disclosed in U.S. Pat. No. 5,785,996 to Snyder, which is incorporated herein by reference, and details a glass making invention with a spinning head comprised of drilled or machined holes to spin out the fibers. The fibers being aided in movement by the centrifugal force and/or by sending pressured air through the system.

After spinning, the fibers are commonly attenuated by withdrawing them from the spinning device at a faster speed than the extrusion speed, thereby producing fibers which are finer and, depending upon the polymer, possibly more crystalline in nature and thereby stronger. The fibers may be attenuated by melt blowing the fibers, that is, contacting the fibers as they emanate from the spinneret orifices with a fluid such as air. The air being under pressure to draw the same into fine fibers, commonly collected as an entangled web of fibers on a continuously moving surface, such as an internal or external conveyor belt or a drum surface, for subsequent processing.

The extruded fibrous web may be gathered into sheet, tube or roll form which may be pleated to increase the surface area for certain filtering applications. Alternatively, the web or fibers may be gathered together and passed through forming stations, such as calendaring rolls, steam treating and cooling stations, which may bond the fibers at their points of contact to form a continuous porous element defining a tortuous path for passage of a fluid material.

While earlier techniques and equipment for spinning fibers have commonly extruded one or more polymer materials directly through an array of spinneret orifices to produce a web of monocomponent fibers or a web of multicomponent fibers, recent developments incorporate a pack of disposable distribution or spin plates juxtaposed to each other, with distribution paths being either etched, grooved, scored, indented, laser cut or slotted into upstream and/or downstream surfaces of the plates to direct streams of one or more polymer materials to and through spinneret orifices at the distal end of the spinning system. Such a manner provides a reasonably inexpensive way to manufacture highly sophisticated spinning equipment and to produce a high density of continuous fibers formed of more than one polymeric material. As an example, a spinning fiberglass die lasts typically 100 hours in production, therefore reducing the cost of this production method will provide financial savings to the user.

One embodiment of current spin plate technology involves circular dies which are cast or drilled with a straight extrusion path. Control over these expensive dies is limited. Such a die is typically made from a block of steel which various channels and die tips required for directing flow of molten polymer are machined, cast or drilled. In order to reduce the degree of metal working needed, in many cases other machined blocks of steel are conjoined to the basic die body to carry the thermoplastic or other fluids required by the particular extrusion process. As extrusion dies grow larger and more complicated due to the use of multiple thermoplastic melts and drawing fluids, the complexity of machining increases geometrically as well as the costs for manufacturing the die.

Another factor adding to the costs of using such dies is the need for frequent cleaning of the residual carbonaceous matter created by the oxidation of the thermoplastics due to high temperature. This requires the availability of additional dies as spares. Dies also have limited life due to the erosion of the die tip tolerances due to the high temperatures and the wear of the fluids flowing through the dies under high pressures. An interchangeable and cost effective die which allows for a variety of configurations is desired in the art.

SUMMARY OF THE INVENTION

The present invention is directed to a fiber making device and apparatus which incorporates a series of two or more stacked, thin circular die plates, two end plates and two enclosure plates, where all of the plates cooperate to form a chamber having opposite ends and define a first end and a second end. The first end will receive material to be formed into fibers and the second end will receive a fiberizing fluid, although the second end could be used to supply a second fiber forming fluid to form composite fibers. All of the die plates have a central opening to receive fiber forming material, and at least one of the die plates has an outflow edge peripheral to the plate which will define a spinneret orifice, which is in fluid communication with said central opening, and which will allow the flow of material along a radial path through which fibers can be extruded. At least one of the die plates has an outflow edge peripheral to the plate which will define an opening and allow for the flow of a fiberizing fluid from the opening so that the material flowing from the spinneret orifice will form fibers which will be engaged and fiberized by the fiberizing fluid.

The present invention provides a fiber spinning device mountable to rotate on a shaft in a fiberizer and can be operated as a fiber spinning device by rotating it or as a melt blown fiber device by using the fiberizing fluid to form the fibers. When it is operated as a fiber spinning device, the fibers can be further attenuated by the fiberizing fluid, which can be air or other fluids.

The present invention also provides a method of forming fibers by providing a material for use in forming fibers, providing a fiberizer with a spinneret capable of being spun about a shaft, such as the spinneret contemplated by the present invention, delivering the fiber forming material to said spinneret, moving the material through said spinneret, extruding the material via an outflow edge located on one of the plates and peripheral to the plate, contacting the extruded fibers with a fiberizing fluid, and collecting the so formed fibers.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 10 is a top view of a bottom end plate;

FIG. 11 is a cross-sectional view, along lines 10-10, of the bottom end plate shown in FIG. 10;

DETAILED DESCRIPTION OF THE INVENTION

Figure 1:
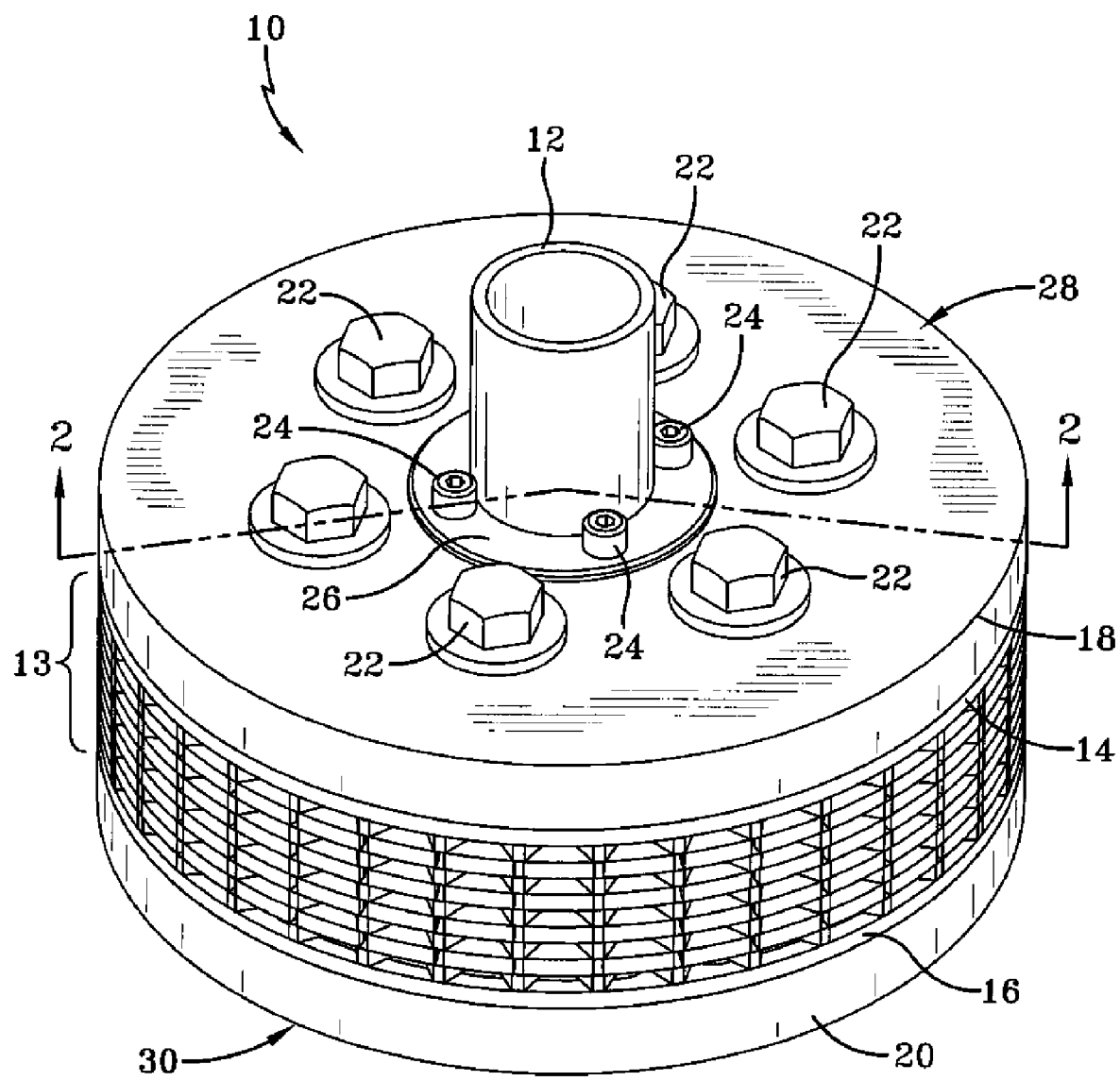
FIG. 1 is a perspective drawing showing an assembled spinneret in accordance with the present invention.

The present invention generally relates to an apparatus for extruding and spinning fibers and relates more particularly to the production of a homogeneous web of fibers. The plate configuration on the apparatus is of particular importance, as it allows production of fibers, including nanofibers and other larger fibers by centrifugal force. The variations in the fibers can be achieved by, but are not limited to, changing the size of the extrusion, changing the RPM speed of the spinning head/shaft, altering the fiber diameter, altering the volume of the extrusion, varying the pressure of the device, varying the temperature extrusion, the selection of the fiberizing fluid, or the selection of another fiber forming material for the purpose of forming composite fibers. For the purpose of this invention a fiberizer is known by its common term in the art, that being a device which produces fibers. The use of a fiberizing fluid allow for the fiberizer to produce fibers without spinning or allows for spun fibers to be further attenuated.

The plates of the device are easily separated to allow cleaning of the extrusion path if clogging occurs during use. As the material moves through the extrusion channel or slots, the plates and/or spacers allow for cleaning by removal of the plates. This cleaning may be required during normal operation, or may be needed during temperature variations if the feed material did not melt/process as expected. Such a method provides a more cost effective and easier clean out method than conventional dies. If a situation exists where wear is high, a disposable plate or module assembly may be a viable alternative. A likely candidate for this type of module would be an extrusion in an abrasive environment. Utilizing a low cost material and a low cost method for creating the module, several spinning plate combinations could be preassembled. As the plates become clogged or wear out, the module is simply discarded; minimizing the amount of time the system is down for turnaround/production.

The current state of the art involves mechanical stamping, and/or electrical discharged machine (EDM) slots and/or grooves being etched/cut from a laser or other applicable device. One advantage of the plate method over the current state of the art is that the plates of the invention may allow for serpentine flow patterns or may be made with curved flow patterns. They need not be limited to linear radial patterns. Utilizing a series of stacked plates or a series of offset plates allows a user the ability to create varied flow patterns in the distribution channel. Such patterns yield better fluid distribution and pressure balance.

As stated prior, the spinning method of the invention utilizes stacked plates versus standard milled and/or drilled dies from "start-up" block, steel components. The invention provides a spinning head which is lower in cost and offers much faster delivery of material to the fiber nonwoven web production. The invention also allows more circumferential orifices per linear inch as the stack/height varies and allows for more versatility of orifice sizes, for more interchangeability and the ability to withstand high pressure. With this invention, there is no limitation regarding plate thickness, slot size, groove size or stack height.

Figure 2:
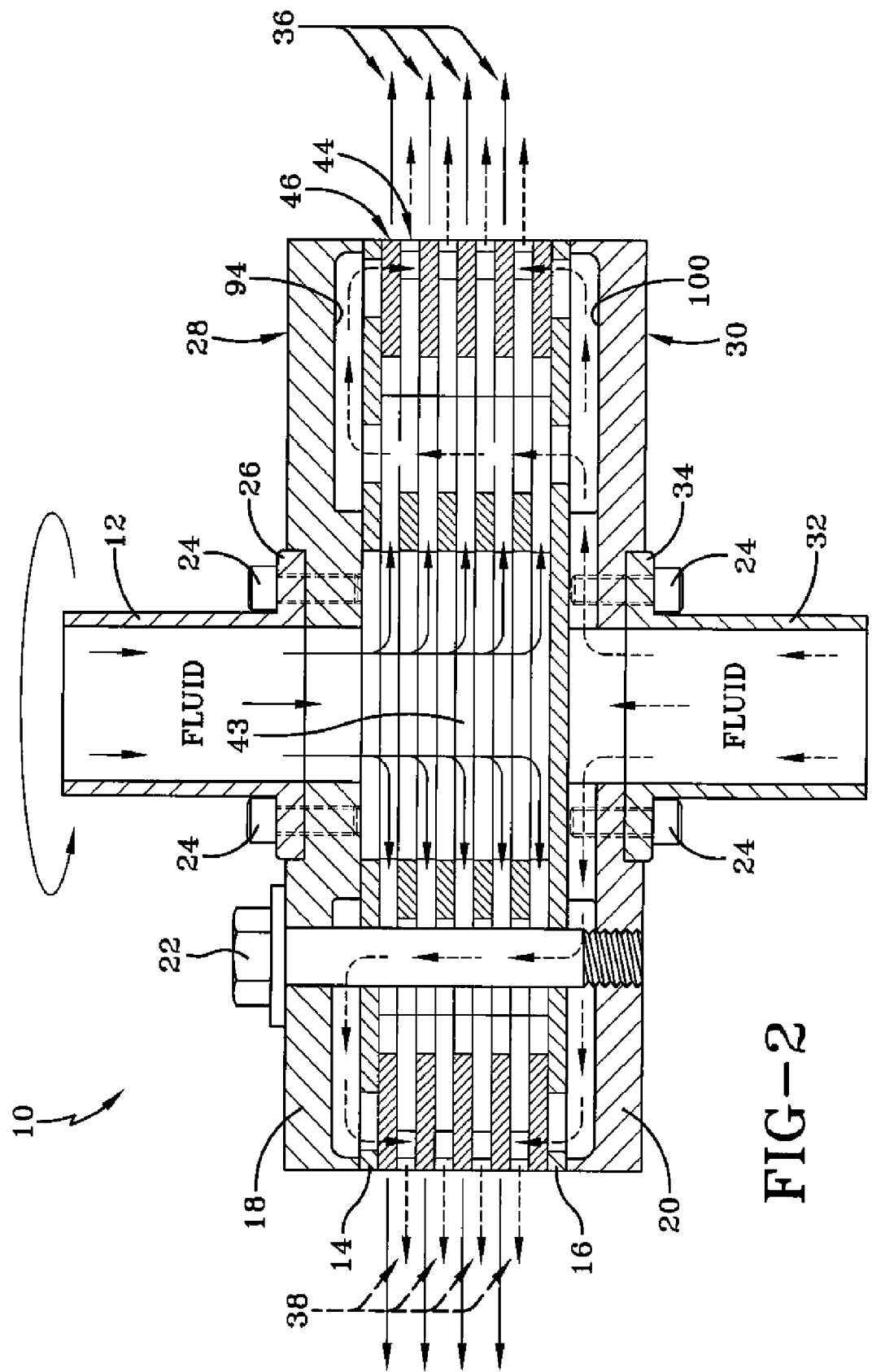
FIG. 2 is a cross-sectional view, along lines 2-2 showing the assembled plates which make up the spinneret.
Figure 3:
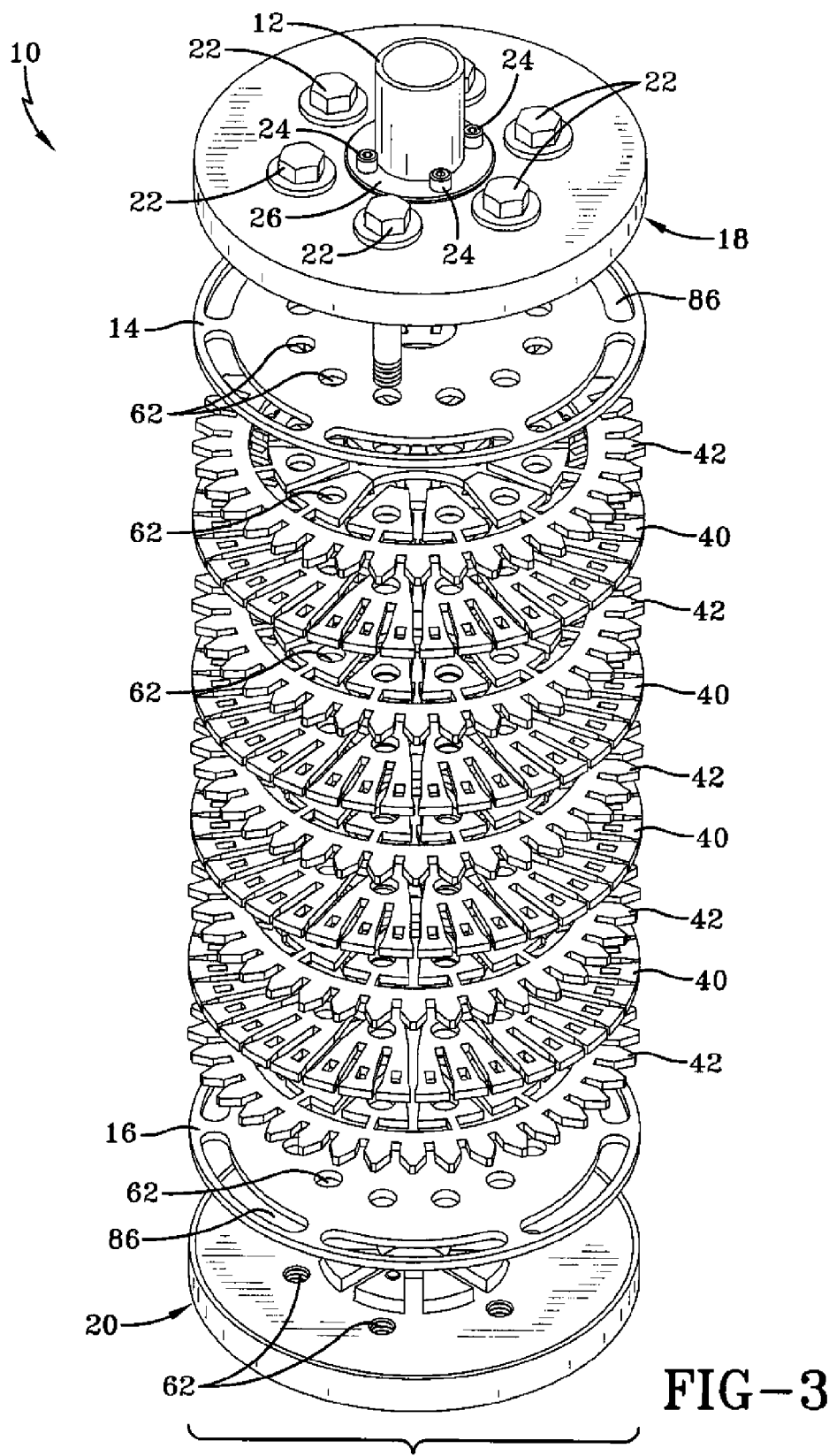
FIG. 3 is an exploded view showing the plates employed in the present invention.

Referring now to the drawings, FIG. 1 details a drawing of the spinneret head 10, which can also be viewed in FIGS. 2 and 3. The head operates by rotating about a cylindrical shaft (not shown), but which is known in the art, and which can be or be part of the fiber forming input pipe 12. In operation, fiber forming material is fed, by gravity or under pressure, to the spinneret head 10 and the fiber forming material enters the spinning head 10 and is centrifugally forced to the edge, allowing for an extrusion of the material as fibers from the spinning head 10. The unit can be kept under a constant temperature by a heating device (not shown) located at a fiber forming material storage area (not shown), or the extruder (not shown), both of which are known in the art, with heat being used to allow for proper flow of the material. The dies can be heated on the peripheral portions of the plates to assure continuous discharge of the fiber forming material. Other means for heating the dies include direct hot air onto the stack, the use of a preheated housing, then mounted, rotating electrical plates mounted onto the top of the housing having an electrical slip ring, embedded heating elements in the plates, or an external heater directed at the peripheral portions of the plates. The flow of material in this embodiment is typically fed under pressure by means of an extruder or metering pump, but can also be fed by gravity. As is known in the art, a driving pulley, or similar system, and a variable speed motor are employed to provide the rotational means which creates the centrifugal force for the process.

The spinneret head 10, has at least two circular plates, but will be illustrated, as an example, with multiple plates. As is seen in FIG. 1, the spinneret head 10 consists of a stack 13 of fiber forming die plates and fiberizing fluid die plates, held together by a top end plate 14, a bottom end plate 16, and two enclosure plates 18, 20. The plate(s) are stamped, machined, etched, scored, laser cut, or indented to create a path through which the materials can flow. The plates are held together with bolts 22, which pass through the plate stack and join them to form the spinneret having a top 28 and a bottom 30. The fiber forming material feed pipe 12 is attached to the plate stack via bolts 24 which pass through an end flange 26. A feed pipe 32 for the fiberizing fluid (seen in FIG. 2), is affixed via flange 34 to the bottom of the spinneret head. At the plate edges, openings are created to allow the fiber forming material to be delivered to the dies that are defined by the plates so that it will be extruded through the die and form fibers. The die stack will also define openings through which the fiberizing fluid will pass and exit from the die stack. This can be seen in FIG. 2, as well as FIGS. 4 and 5. The flow of the fiber forming material is represented by the solid arrows 36, while the flow of the fiberizing fluid is represented by the dotted arrows 38. The openings will be a full plate thickness opening through which the materials can pass, or can be a partial plate thickness openings, which can be formed by stamping, machining, etching, scoring, laser cutting or indenting into the surface. The partial opening can be on one or both sides of the plate. The use of the partial or full opening is determined based on the application.

FIG. 3 details the stacked plates 13 used in the spinning apparatus. Two different types of plates are employed, a fiber forming plate 40 and a fiberizing fluid plate 42. In most embodiments the plates are stacked in an alternating manner with a fiberizing fluid plate 42, next to a fiber making plate 40. This process being repeated as needed. The stacked plates 13 are then joined with top 14 and bottom 16 end plates and enclosure plates 18, 20 to complete the spinneret head 10.

Figure 4:
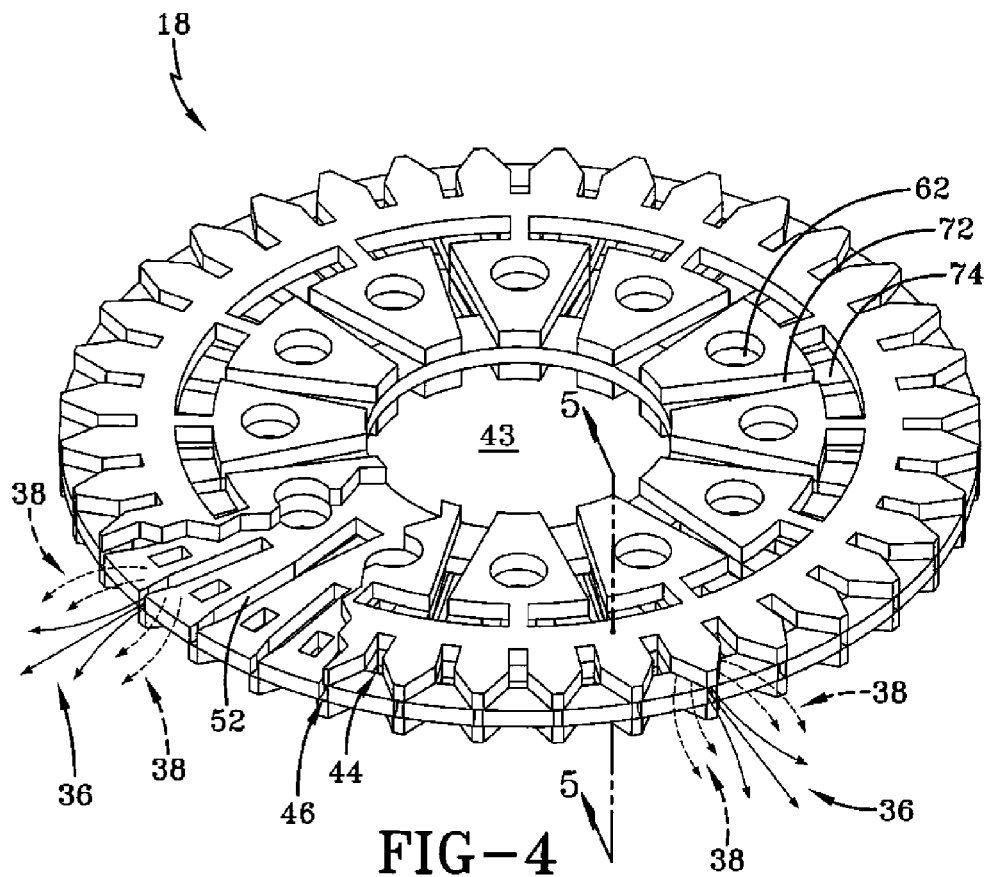
FIG. 4 is a perspective view of two fiberizing fluid plates and one fiber forming plate to show the spinneret orifice.
Figure 5:
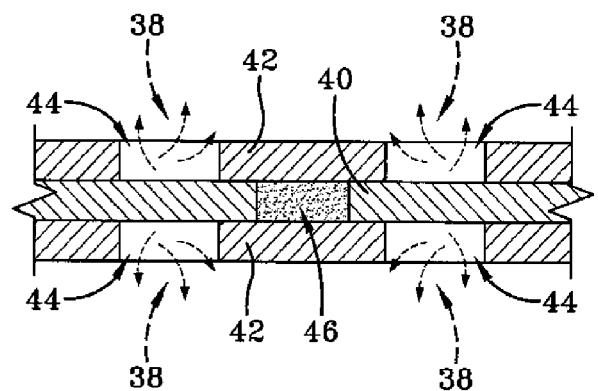
FIG. 5 is a partial end view of the plates in FIG. 4.
Figure 6:
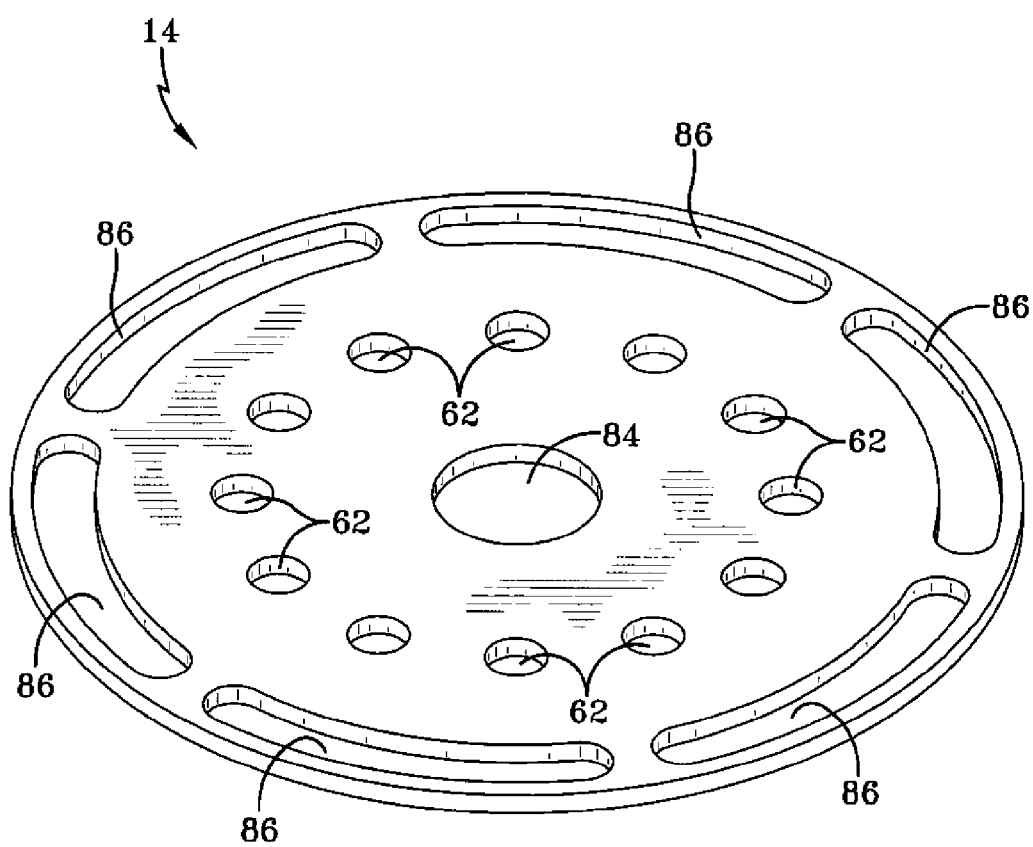
FIG. 6 is a perspective view of a top chamber or end plate.
Figure 7:
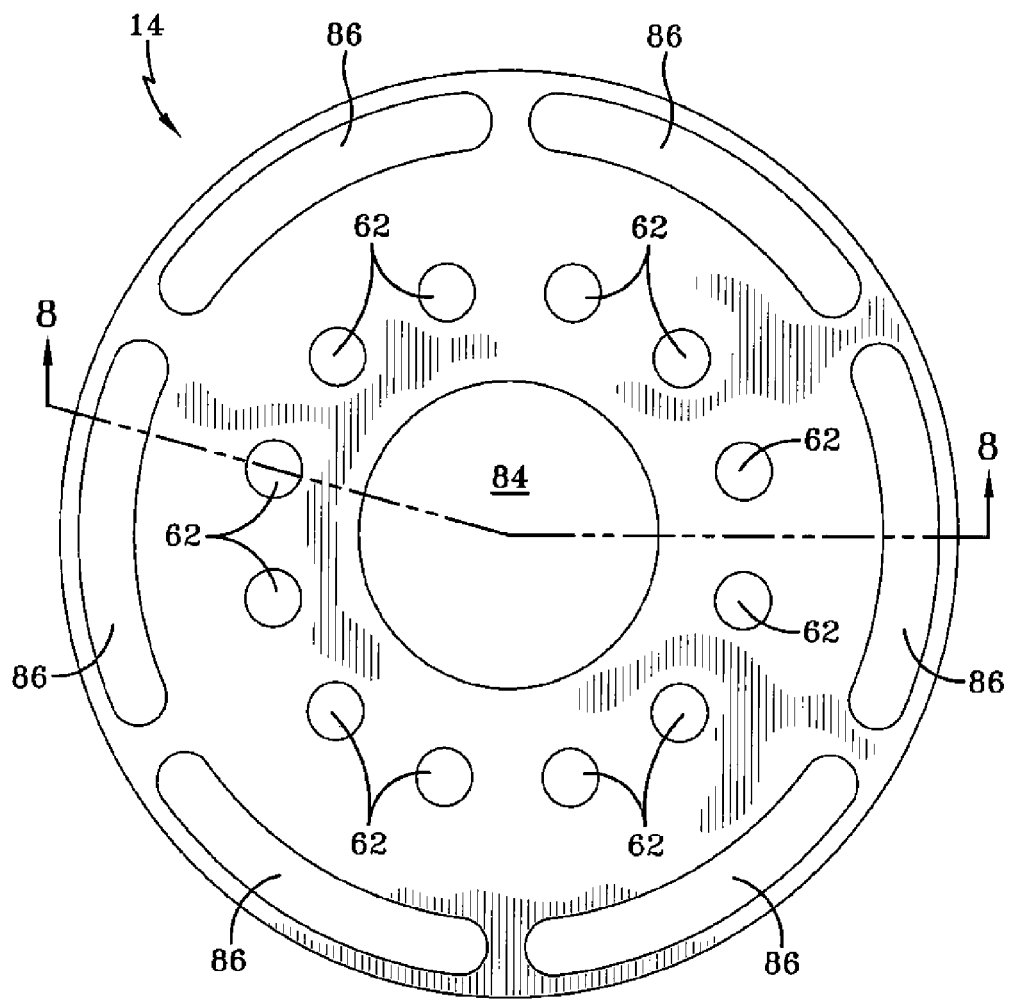
FIG. 7 is a top view of a top end plate.
Figure 8:
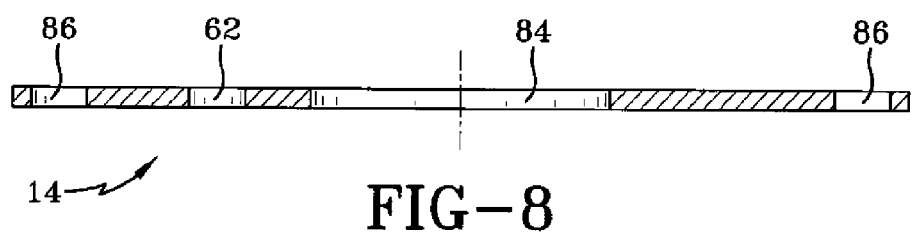
FIG. 8 is a cross-sectional view, along lines 8-8, of the bottom end plate shown in FIG. 7.
Figure 9:
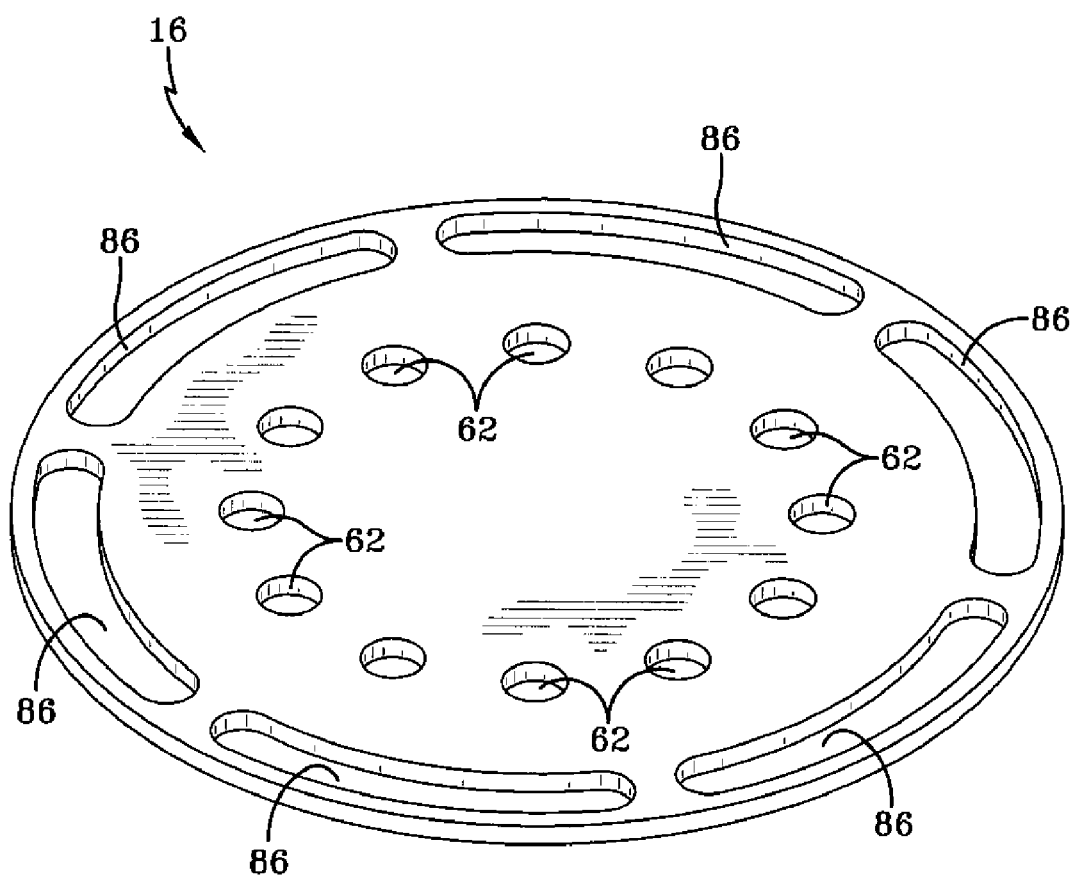
FIG. 9 is a perspective view of a bottom chamber or end plate.
Figure 12:
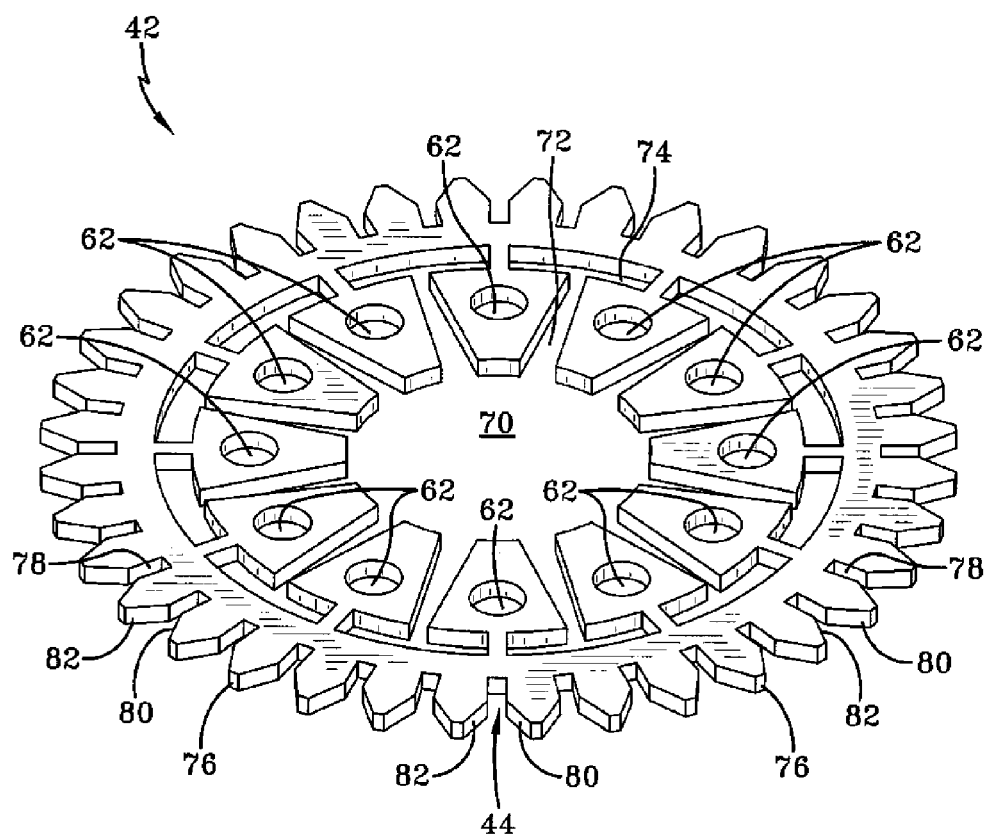
FIG. 12 is a perspective view of a fiberizing fluid die plate.
Figure 13:
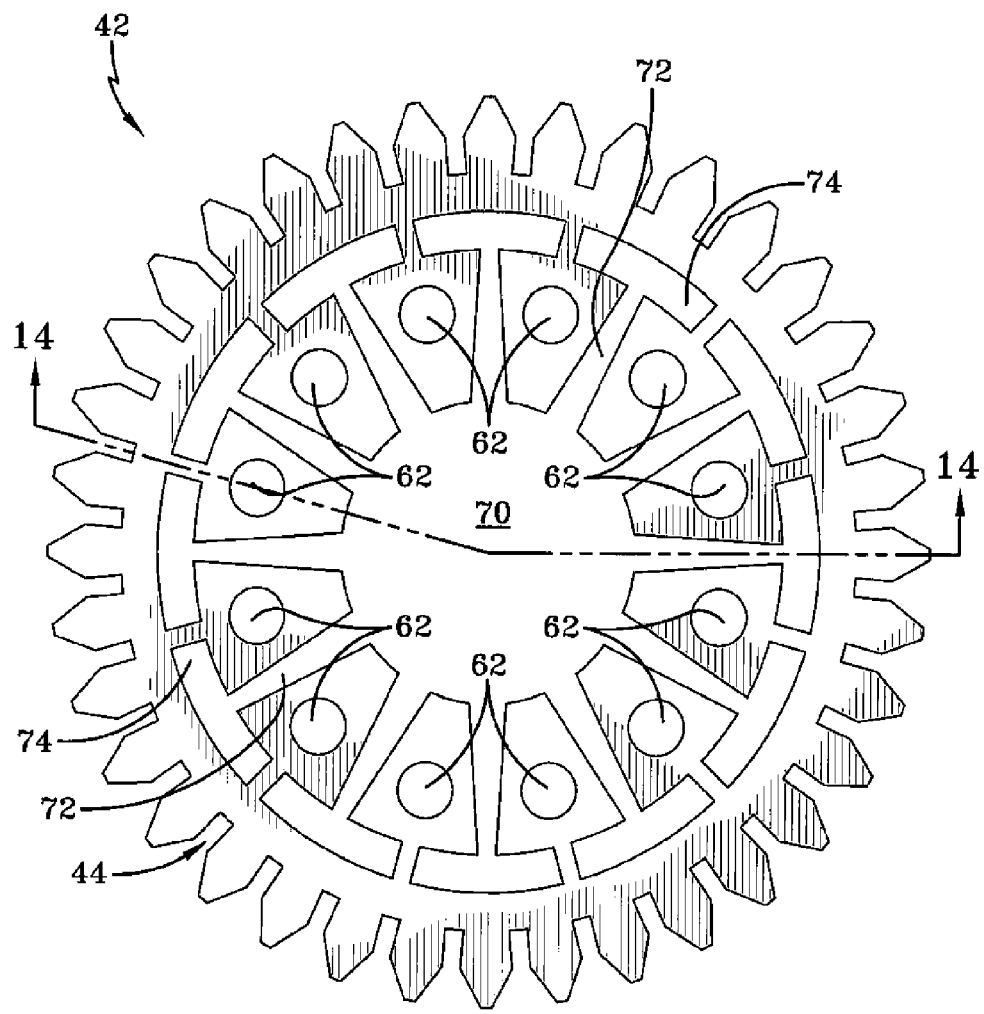
FIG. 13 is a top view of a fiberizing fluid die plate.
Figure 14:
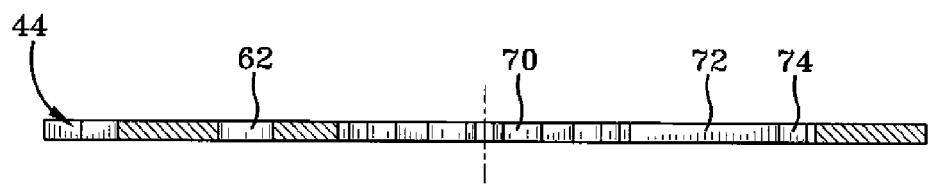
FIG. 14 is a cross-sectional view, along lines 14-14, of the fiberizing fluid die plate shown in FIG. 13

As shown in FIGS. 2, 3, and 4, the fiber forming material flows from a storage area (not shown) and/or an extruder, and flows through fiber forming material feed inlet 12 to the spinneret head. The fiber forming material travels inlet 12 to a central opening 43, located in fluid communication with the inlet 12, and defined by openings in plates. The material travels from the central opening 43 and by centrifugal force flows through openings in the spinning plate stack 13. The material being forced from the center of the spinning plates to the outer edge. The outermost edge of the plate stack 13 will define the openings 44 through which the fiberizing fluid flows and the die opening 46 through which the fiber forming material will exit as fibers.

Typically the material used in constructing the enclosure plates is thicker than the fiber forming material plates 40 and/or the fiberizing fluid plates 42 since this allows for high pressures in the apparatus.

The fiber forming plates 40 and fiberizing fluid plates 42 are typically derived from stamped, machined, laser cut, etched, scored, indented or electrical discharged machining methods. In cases where the alteration does not go though the entire thickness of the plate the fiber forming plates 40 and fiberizing fluid plates 42 may be marked or altered on either one or both sides of the plate.

Figure 15:
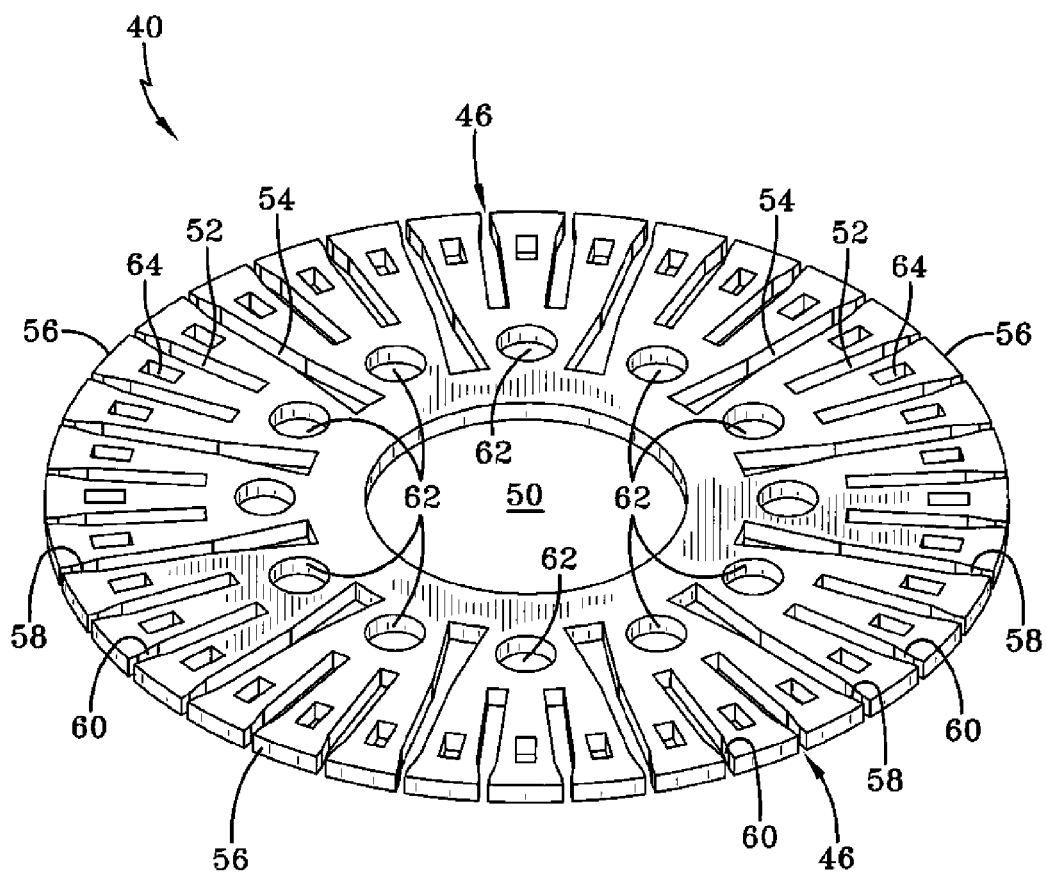
FIG. 15 is a perspective view of a fiber forming die plate.
Figure 16:
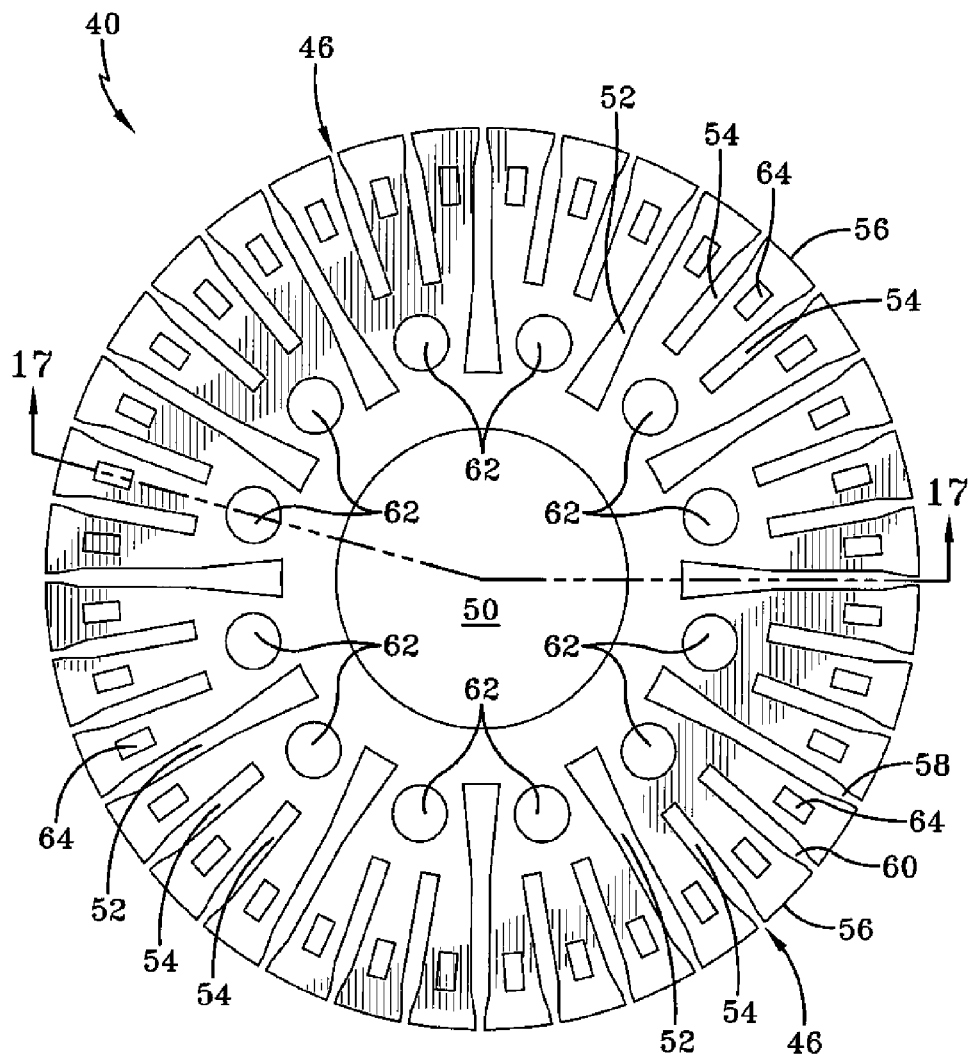
FIG. 16 is a top view of a fiber forming die plate.
Figure 17:
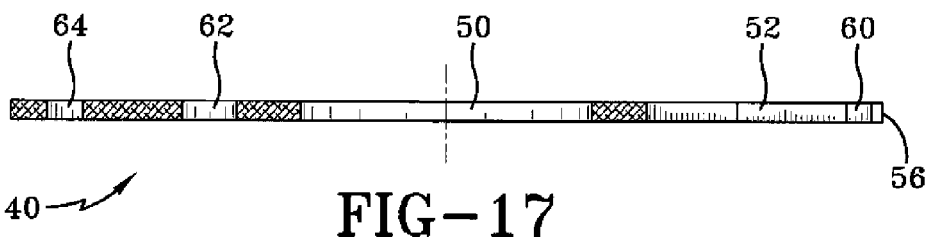
FIG. 17 is a cross-sectional view, along lines 17-17, of the fiber forming die plate shown in FIG. 16.
Figure 18:
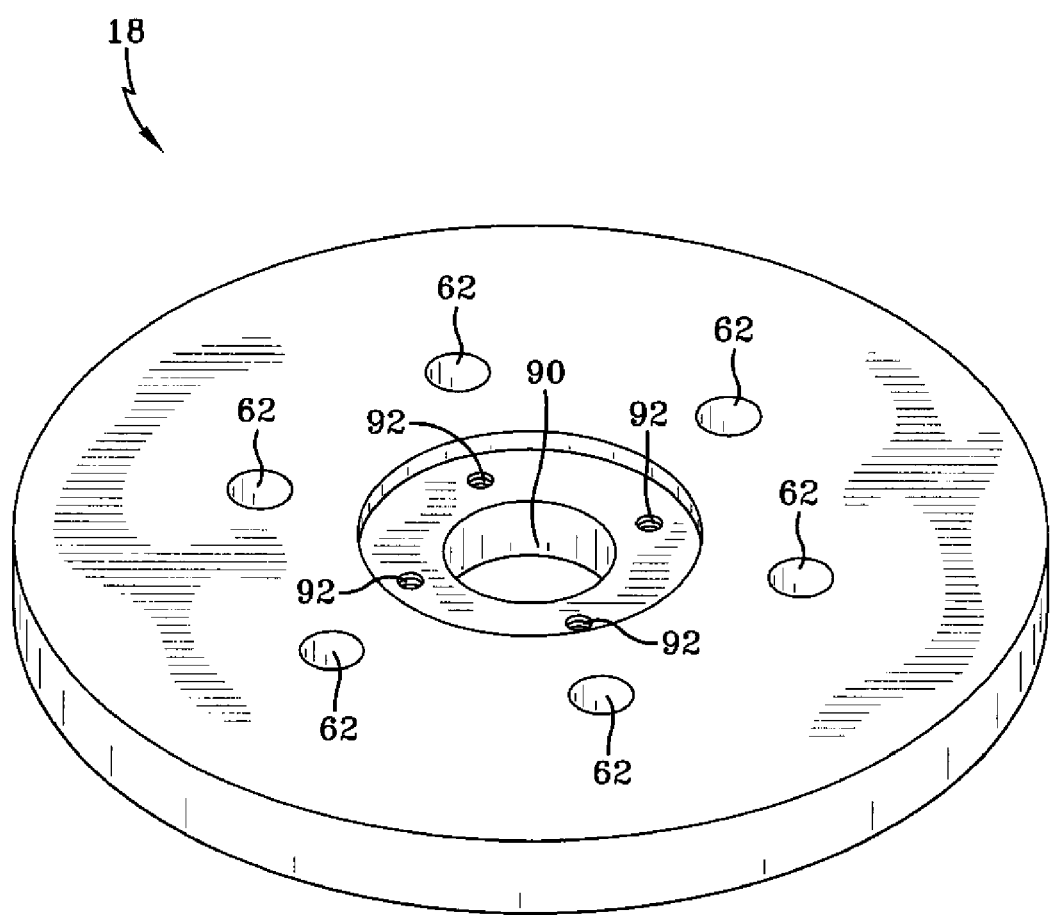
FIG. 18 is a perspective view of a top enclosure plate.
Figure 19:
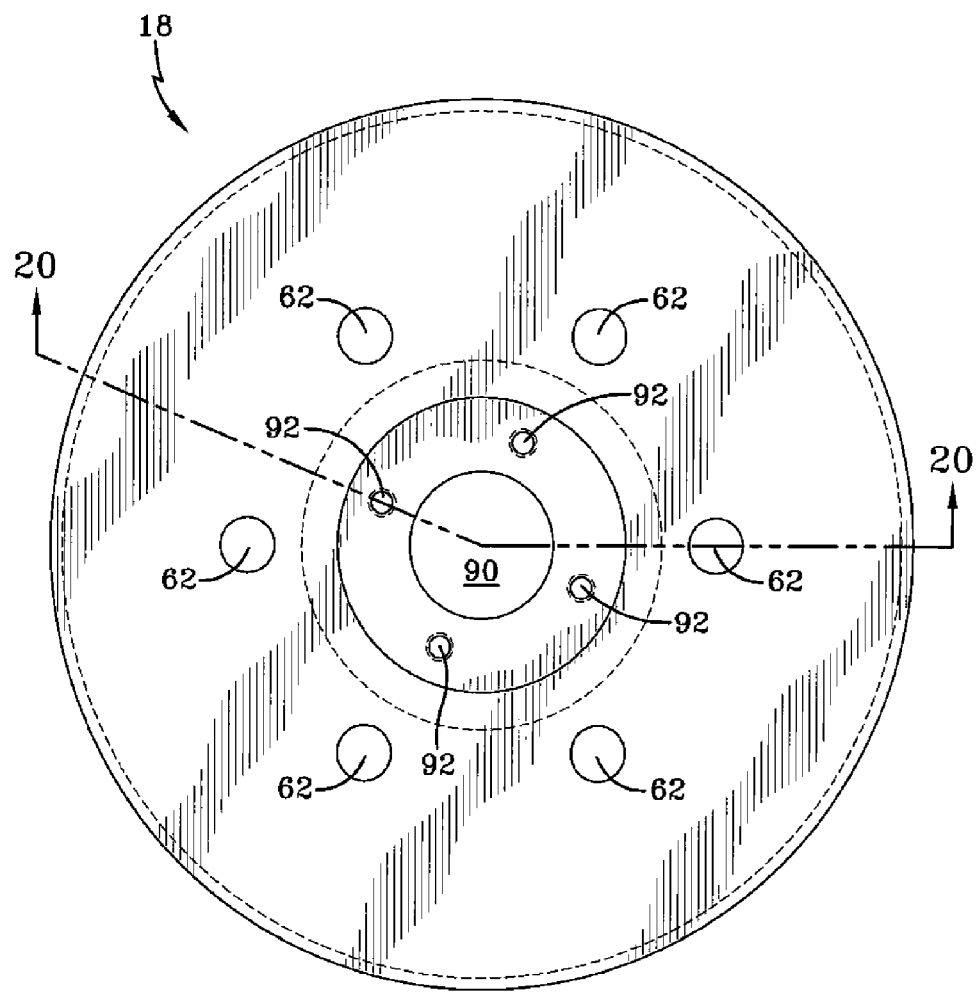
FIG. 19 is a top view of a top enclosure plate.
Figure 20:
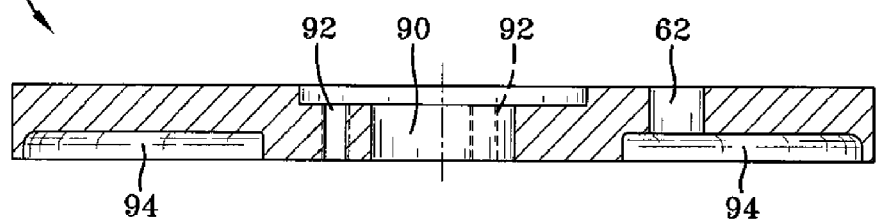
FIG. 20 is a cross-sectional view, along lines 20-20, of the top enclosure plate shown in FIG. 19.
Figure 21:
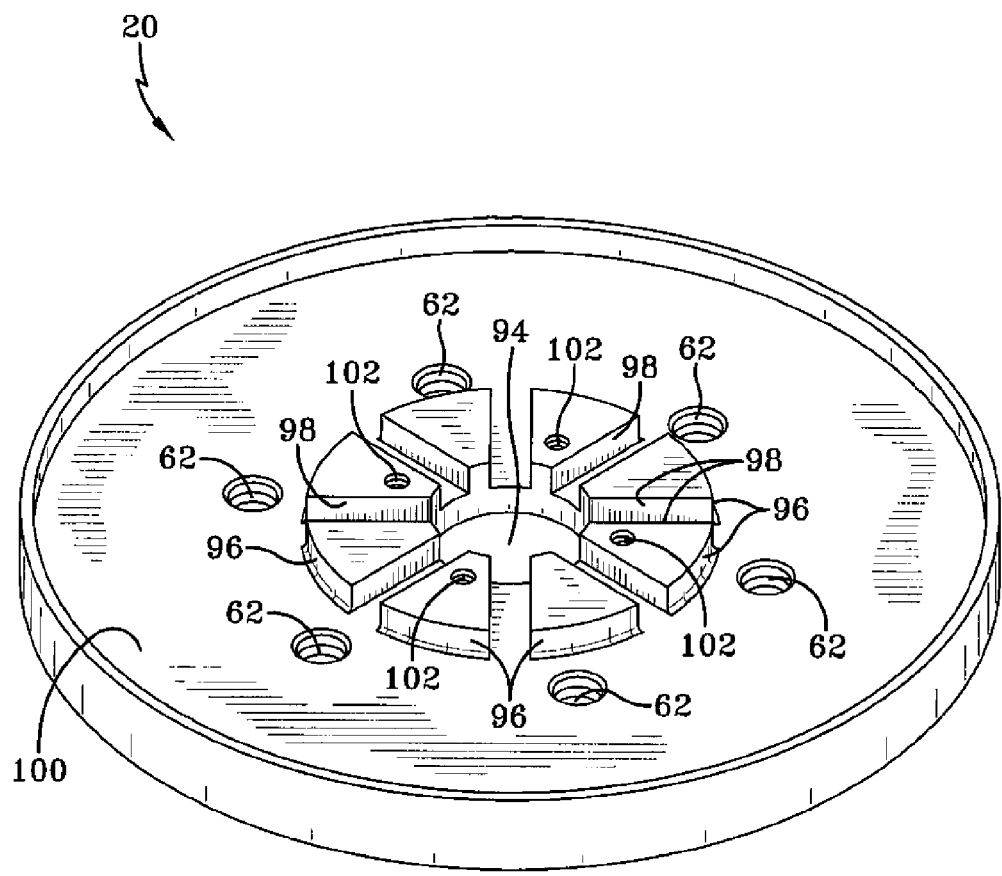
FIG. 21 is a perspective view of a bottom enclosure plate.
Figure 22:
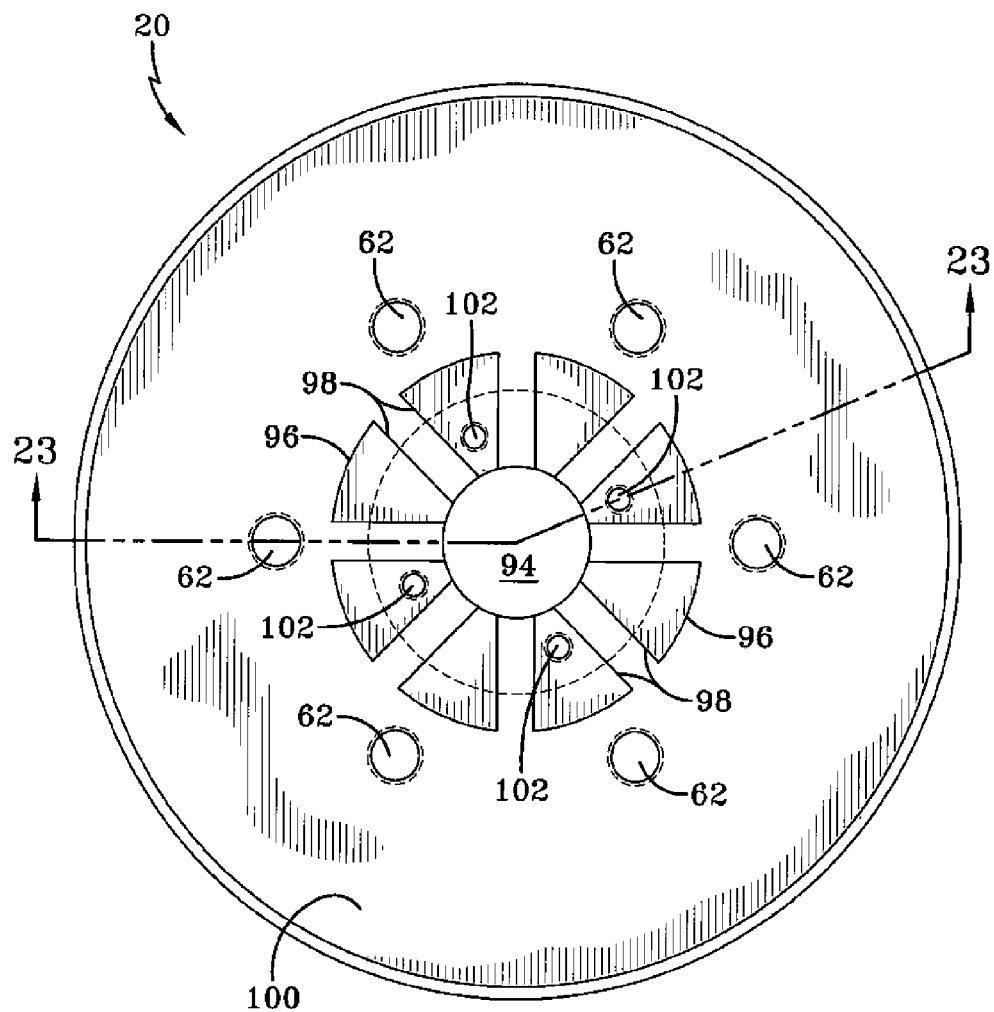
FIG. 22 is a top view of a bottom enclosure plate.
Figure 23:
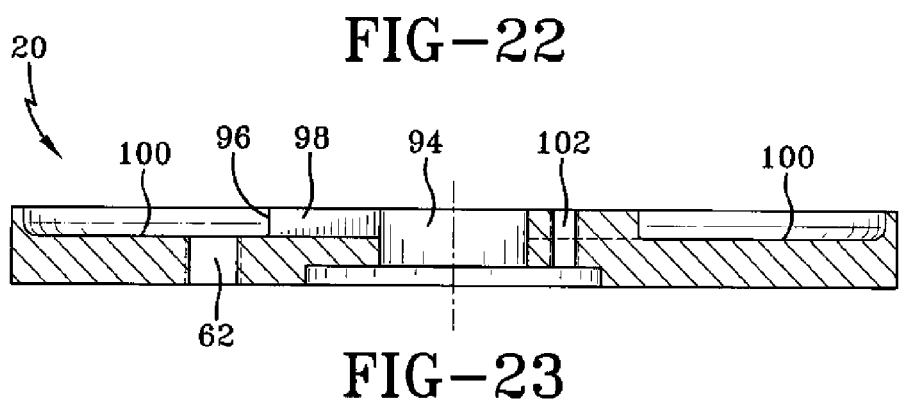
FIG. 23 is a cross-sectional view, along lines 23-23, of the bottom enclosure plate shown in FIG. 22.

The fiber making plates 40 and the fiberizing fluid plates 42 will be described by reference to them as the fiber making plates and the fiberizing fluid plates. But, neither plate functions primarily for that purpose and the description is for convenience and understanding. In fact, they cooperate together to achieve the proper functionality with the fibers emerging from the die defined by the edge of the fiber forming plate and the fiberizing fluid emerging from the opening defined by the edge of the fiberizing fluid plate. Further, the use of the term fiberizing fluid is intended to include liquids and gases, as well, as other fiber forming materials, which, as discussed, would be in a fluid state, and produce composite fibers. The fiber making plate is shown in FIGS. 15, 16 and 17 and is a circular plate with a center hole or opening 50. The center opening 50 along with a center opening in the other plates will define the central opening 43 which allows for the fiber forming material to be distributed to the channels which are in fluid communication with the die openings 46. The fiber making plate 40, typically has a series of channels or slots 52 and 54 radiating toward the outflow edge 56. The shape of the channels is not critical, but are designed to facilitate the flow of the fiber forming material toward the outflow edge 56. Near the edge, the channels 52 and 54 will narrow at 58 and 60, respectively, to increase the pressure and produce a flow through the die opening 46 and result in the material being extruded as a fiber. The size of the die orifice 46 varies with dimensions as small as 0.0005" by 0.0005". The fiber forming plates will also have a series of bolt holes or openings 62 which, as will be explained further, will be used for the bolts 22 used to secure the head together and to provide a vertical passage for the fiberizing fluid. The simplest utilization is to use every other hole for a bolt and the alternate holes as the fluid passage. Peripheral fluid passages 64 are also provided peripherally near the plate edge and they will cooperate with similar passages in other plates to provide another vertical fluid distribution channel.

The thickness of the fiber forming plate 40, and the fiberizing fluid plate 42, will vary, but will have a thickness of between 0.0005" and 0.1". For the purposes of this application, the term "thin" is intended to mean plates having a thickness of between about 0.0005 inch and 0.1 inch. The plates themselves are typically made from ferrous or nonferrous metals but can also be made from plastic, ceramic, inconel or any other suitable materials. Advantages provided by the use of ceramic plates involves less wear and the ability to withstand higher temperatures. When combining plates a variety of thicknesses can be used as it is not necessary to use one standard plate thickness.

The fiberizing plate 42 is also circular with a center hole or opening 70 which is in fluid communication with radial distribution openings or channels 72, which, in turn, are in fluid communication with lateral distribution openings or channels 74. The distribution channels allow the fiber forming material to flow from the central opening 43 to the distribution channels 52 and 54 in the fiber forming plate from whence it will flow to the die openings 46. The fiberizing plates 42 also have bolt/fluid distribution holes 62, which function as described earlier. At the peripheral edge 76 of the plate is a radial distribution channel 78 through which the fiberizing fluid will flow to opening 44 where it exits from the plate. The shape of the distribution channel 78 is not critical. At the peripheral edge of the plate the opening 44 is flared by the use of slanted surfaces 80 and 82. The shape is not critical and facilitate to flow of the exiting fluid.

The end plates are also circular in design and are similar, except that the top end plate 14 (versus the bottom end plate 16) has an additional opening 84 which is in fluid communication with the feed pipe 12 to allow the fiber forming materials to pass into central opening 43 for distribution, ultimately, to the die openings 46. Each end plate has openings 62 for the bolts and which together form a vertical fluid passage for distribution of the fiberizing fluid. Each plate has a series of annular channels 86 located near the periphery of the plate for distribution of the fiberizing fluid and in the assembled spinneret head are in fluid communication with fluid distribution channels 64 and 78.

The stack of plates are brought together using enclosure plates 18 and 20, shown in FIGS. 18-23. Top enclosure plate 18 is circular in design and has a central opening 90 in fluid communication with feed pipe 12 which is attached to top enclosure plate 18 via bolts 24 secured into bolt holes 92. Bolt holes 62 are used to bolt the plate stack together. Top plate 18 has an annular recess 94 on the side of the enclosure plate that is joined to the stack. Recess 94 provides, in the assembled stack, a fluid distribution channel for the fiberizing fluid and is in fluid communication with distribution holes 62 and fluid distribution channels 64 and 78. Bottom enclosure plate 20 is also circular in design and has a central opening in fluid communication with fiberizing fluid feed pipe 32. It has bolt holes 62 for securing it to the plate stack and bolt holes 102 for securing feed pipe 32 to it. Like top enclosure plate 12, bottom enclosure plate 20 has an annular recess 100 in the face of the plate that is joined to the plate stack. When joined, recess 100 is in fluid communication with fluid distribution holes 62 and fluid distribution channels 64 and 78. Also, bottom enclosure plate has a raised annular portion 96 having fluid distribution channels 98 in it to distribute fiberizing fluid as it enters the spinneret from feed pipe 32 via opening 94.

In operation, the combination of the assembled plate and the distribution channels will provide the fluid communication paths for the fiber forming fluid and the fiberizing fluid. The fiber forming fluid enters the spinneret via pipe 12 through opening 90 continues through opening 84 into central opening 43. The fiber forming material is then distributed to die openings 46 via channel 72 to channel 74, 52 and 54 which lead to die openings 46. The fiber making material exits the die opening due to pressure and/or centrifugal force (when the spinneret head is spinning). The fiberizing fluid enters the spinneret head via feed pipe 32 and opening 94. From there it is distributed via channels 98 to channel 100. As can be seen in FIG. 2, the fiberizing fluid flows though distribution openings 62 to the top end of the spinneret where it is distributed to channels 64 and 78, while simultaneously, it is distributed to channels 64 and 78 via channel 100. The fluid then exits the spinneret via openings 44 where it will encounter the fibers extruding from die openings 46. The force of the fluid on the fibers will further attenuate the fiber or when the fluid is another fiber forming material, will join with the first fibers to create a composite or mix of fibers.

Figure 24:
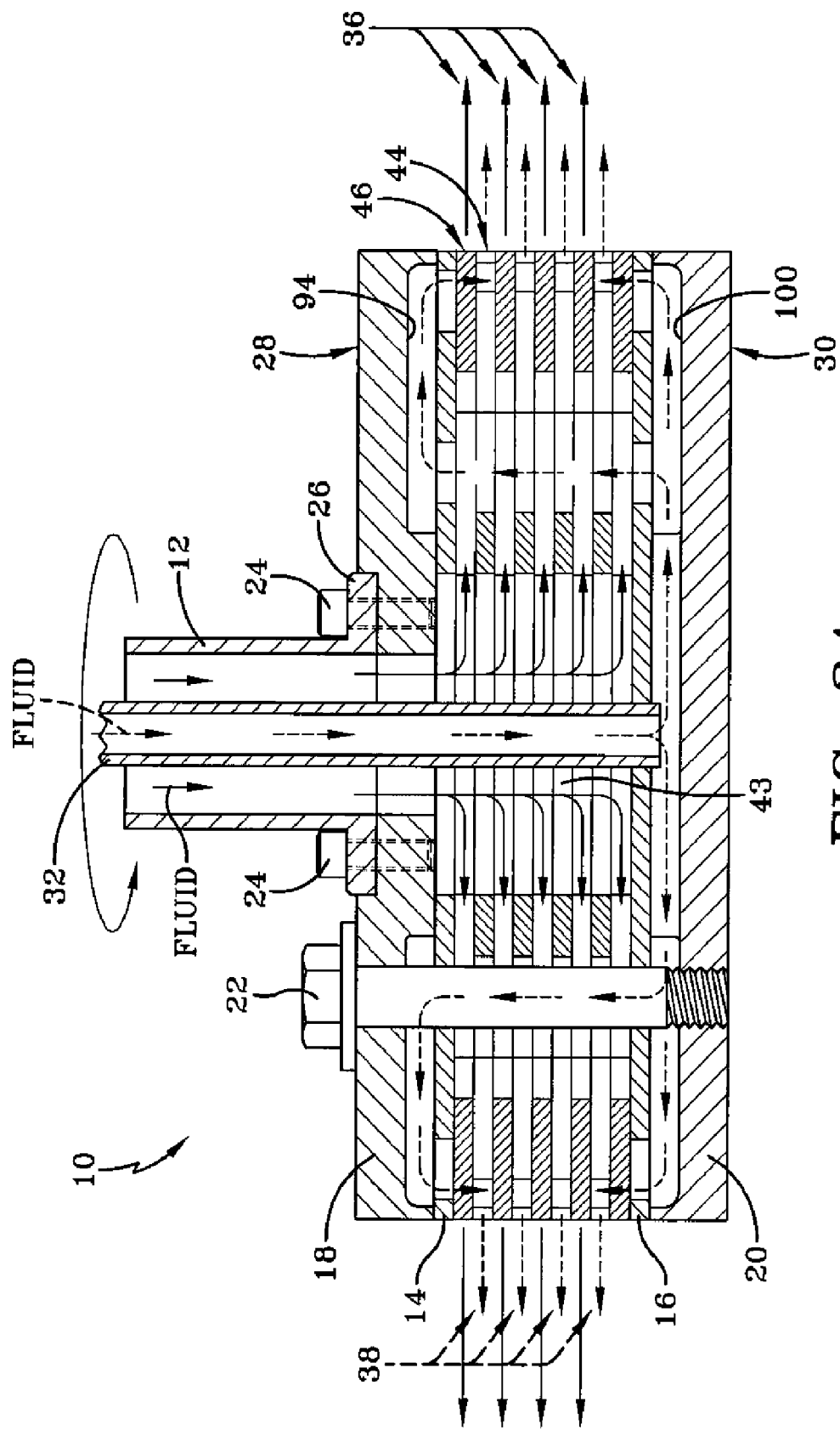
FIG. 24 is a cross-sectional view, similar to FIG. 2, of another embodiment of the spinneret in FIG. 1, where the fiber forming material and the fiberizing fluid are fed from the same end.

The invention has been described in terms of the fiber forming material being fed at the top of the spinneret and the fiberizing fluid being fed at the bottom of the spinneret, but the invention is not limited to that and both the fiber forming material and the fiberizing fluid could be fed from the same end as shown in FIG. 24. In that case the feed pipes would be concentric pipes with the fiberizing fluid pipe being in the center and the fiber forming material feed pipe being outside of the center pipe so that the fiber forming material is fed in an annular space outside of the fiberizing fluid pipe.

The mechanism (not shown) to spin the fibers has a speed which can vary from 50 to 20,000 revolutions per minute. Varying the speed of this device will affect the amount/qualities/diameters of the resultant fiber. Also, changing the fluid viscosity, via the heater or by changing chemical/flow properties of the source material will affect the fiber amount/qualities/diameters.

The source material used for fiber making can be, but is not limited to glass, polymers, such as polypropylene, or thermoplastic materials. Organic polymer materials made from sugar and corn can be used. The material is heated and spun under temperature, however it is also possible to cold spin a raw material if the chemical properties and/or makeup of the materials allows for flow at room temperature or less than room temperature. The typical end product created can be, but is not limited to substrates, nonwoven media, geotextiles, insulation and other areas where fiber is the primary end product.

The temperatures of the extrusion will also vary based on application and method of use. The melt and flow point of the material being used will dictate the optimum temperature for extrusion. For example, a temperature of 450 to 500° F. would be utilized for the material flow of polypropylene.

Although the invention has been described in detail with reference to particular examples and embodiments, the examples and embodiments contained herein are merely illustrative and are not an exhaustive list. Variations and modifications of the present invention will readily occur to those skilled in the art. The present invention includes all such modifications and equivalents. The claims alone are intended to set forth the limits of the present invention.

What is claimed is:

1. A fiber spinning device mountable to rotate on a shaft in a fiberizer comprising:
   two or more stacked, thin circular die plates, two end plates and two enclosure plates;
   wherein at least one of the die plates is a fiber forming die plate and at least one of the die plates is fiberizing fluid die plate:
   wherein all of the die plates have a center opening and all of the plates cooperate to form a central open chamber which can fluidly communicate with a source of fiber forming material to receive fiber forming material;
   wherein the device has means for receiving material to be formed into fibers;
   wherein the device has means for receiving a fiberizing fluid;
   wherein at least one of the fiber forming die plates has an outflow edge peripheral to the plate which will define a spinneret orifice through which a fiber forming material flows, which is in fluid communication with said central opening, and which will allow the flow of said fiber forming material along a radial path through which fibers can be extruded, and wherein said fiber forming die plates have fluid distribution openings which are in fluid communication and can form vertical fluid passages;
   wherein at least one of the fiberizing fluid die plates has an outflow edge peripheral to the plate which will define an opening and allow for the flow of an additional fiber forming material or a fiberizing fluid through said opening, and wherein said fiberizing fluid die plates have fluid distribution openings which are in fluid communication and can form vertical fluid passages;

wherein the fiber forming die plates have radial openings to facilitate the passage of the fiber forming material to the orifice;

wherein the fiberizing fluid die plates have radial openings to facilitate the passage of the additional fiber forming material or fiberizing fluid through the die;

wherein the end plates have openings which are in fluid communication with the additional fiber forming material or fiberizing fluid, and which in combination with the openings in said die plates form vertical fluid passages, and facilitate the distribution of the additional fiber forming material or fiberizing fluid;

wherein said enclosure plates bring said stack of plates together and have fluid distribution channels which are in fluid communication with said vertical fluid passages and facilitate the distribution of said fiber forming material or said additional fiber forming material or fiberizing fluid;

wherein said die plates, end plates, and enclosure plates have openings for a means for bringing and securing said stack of plates together, wherein said openings can serve as said vertical fluid passages, and wherein said stack of plates can be secured using said vertical passages; and whereby the fiber forming material flowing from the spinneret orifice will form fibers which will be engaged by the additional fiber forming material or fiberizing fluid to shape said fibers.

2. The device of claim 1 where the plates are made by stamping, machining, etching, laser cutting or electrical discharge machining.

3. The device of claim 1 wherein the die plates have a thickness between 0.0005" and 0.1".

4. The device of claim 1 wherein the die plates have openings therein which facilitate the flow of a fiber forming material from the central open chamber.

5. The device of claim 1 wherein the one or more plates are made from ferrous metal, non ferrous metal, aluminum, steel, iron, plastic, inconel or ceramic materials.

6. The device of claim 1 wherein the device operates at a pressure from 1 to 500 atmospheres.

7. The device of claim 1 wherein the plates are disposable.

8. A method of spinning fibers comprising the steps of:
providing a material for use in forming fibers;
providing an additional fiber forming material or fiberizing fluid;
providing a fiberizer with a spinneret capable of being spun about a shaft comprising two or more stacked, thin circular die plates, two end plates and two enclosure plates;
wherein at least one of the die plates is a fiber forming die plate and at least one of the die plates is fiberizing fluid die plate:
wherein all of the die plates have a center opening and all of the plates cooperate to form a central open chamber which can fluidly communicate with a source of fiber forming material to receive fiber forming material;
wherein the spinneret has means for receiving material to be formed into fibers;
wherein the spinneret has means for receiving an additional fiber forming material or fiberizing fluid;
wherein at least one of the fiber forming die plates has an outflow edge peripheral to the plate which will define a spinneret orifice that will receive the fiber forming material, which is in fluid communication with said central opening, and which will allow the flow of said fiber forming material along a radial path through which fibers can be extruded, and wherein said fiber forming die plates have fluid distribution openings which are in fluid communication and can form vertical fluid passages;

wherein at least one of the fiberizing fluid die plates has an outflow edge peripheral to the plate which will define an opening and allow for the flow of an additional fiber forming material or a fiberizing fluid from the opening, and wherein said fiberizing fluid die plates have fluid distribution openings which are in fluid communication and can form vertical fluid passages;

wherein the fiber forming die plates have radial openings to facilitate the passage of the fiber forming material to the orifice;

wherein the fiberizing fluid die plate have radial openings to facilitate the passage of the additional fiber forming material or fiberizing fluid through the die plates;

wherein the end plates have openings which are in fluid communication with the additional fiber forming material or fiberizing fluid, and which in combination with the openings in said die plates form vertical fluid passages, and facilitate the distribution of the additional fiber forming material or fiberizing fluid;

wherein said enclosure plates bring said stack of plates together and have fluid distribution channels which are in fluid communication with said vertical fluid passages and facilitate the distribution of said fiber forming material or said additional fiber forming material or fiberizing fluid;

wherein said die plates, end plates, and enclosure plates have openings for a means for bringing and securing said stack of plates together, wherein said openings can serve as said vertical fluid passages, and wherein said stack of plates can be secured using said vertical passages; and whereby the fiber forming material flowing from the spinneret orifice will form fibers which will be engaged and shaped by said an additional fiber forming material or fiberizing fluid;

delivering the fiber forming material to said spinneret;
delivering the additional fiber forming material or fiberizing fluid to said spinneret;
moving the fiber forming material through said spinneret so that it is extruded as fibers through the orifice;
contacting the extruded fibers with the an additional fiber forming material or fiberizing fluid; and
collecting the so formed fibers.

9. The method of claim 8 where the plates are made by stamping, machining, etching, laser cutting or electrical discharge machining.

10. The method of claim 8 wherein the die plates have a thickness between 0.0005" and 0.1".

11. The method of claim 8 wherein the die plates have openings therein which facilitate the flow of a fiber making material from the central open chamber.

12. The method of claim 8 wherein the plates are made from ferrous metal, non ferrous metal, aluminum, steel, iron, plastic, inconel or ceramic materials.

13. The method of claim 8 wherein the device operates at a pressure from 1 to 500 atmospheres.

14. The method of claim 8 wherein the one or more plates are disposable.

15. An apparatus for spinning fibers comprising:
at least one source of fiber forming material;
at least one source of additional fiber forming material or fiberizing fluid;
a spinneret comprising two or more stacked, thin circular die plates, two end plates and two enclosure plates;

wherein at least one of the die plates is a fiber forming die plate and at least one of the die plates is fiberizing fluid die plate;

wherein spinneret has means for receiving material to be formed into fibers;

wherein the spinneret has means for receiving an additional fiber forming material or fiberizing fluid;

wherein all of the die plates have a center opening and all of the plates cooperate to form a central open chamber which can fluidly communicate with a source of fiber forming material to receive fiber forming material;

wherein at least one of the fiber forming die plates has an outflow edge peripheral to the plate which will define a spinneret orifice that will receive a fiber forming material, which is in fluid communication with said central opening, and which will allow the flow of said fiber forming material along a radial path through which fibers can be extruded, and wherein said fiber forming die plates have fluid distribution openings which are in fluid communication and can form vertical fluid passages;

wherein at least one of the fiberizing fluid die plates has an outflow edge peripheral to the plate which will define an opening and allow for the flow of an additional fiber forming material or a fiberizing fluid from the opening, and wherein said fiberizing fluid die plates have fluid distribution openings which are in fluid communication and can form vertical fluid passages;

wherein the fiber forming die plates have radial openings to facilitate the passage of the fiber forming material to the orifice;

wherein the fiberizing fluid die plates have radial openings to facilitate the passage of the additional fiber forming material or fiberizing fluid through the die plates;

wherein the end plates have passages which are in fluid communication with the additional fiber forming material or fiberizing fluid, and which in combination with the openings in said die plates form vertical fluid passages, and facilitate the distribution of the additional fiber forming material or fiberizing fluid;

wherein said enclosure plates bring said stack of plates together and have fluid distribution channels which are in fluid communication with said vertical fluid passages and facilitate the distribution of said fiber forming material or said additional fiber forming material or fiberizing fluid;

wherein said die plates, end plates, and enclosure plates have openings for a means for bringing and securing said stack of plates together, wherein said openings can serve as said vertical fluid passages, and wherein said stack of plates can be secured using said vertical passages; and whereby the material flowing from the spinneret orifice will form fibers which will be engaged and shaped by said additional fiber forming material or fiberizing fluid; and means for collecting the so formed fibers.

16. The apparatus of claim 15 where the one or more plates are made by stamping, machining, etching, laser cutting or electrical discharge machining.

17. The apparatus of claim 15 wherein the die plates have a thickness between 0.0005" and 0.1".

18. The apparatus of claim 15 wherein the die plates have openings therein which facilitate the flow of a fiber making material from the central open chamber.

19. The apparatus of claim 15 wherein the one or more plates are made from ferrous metal, non ferrous metal, aluminum, steel, iron, plastic, inconel or ceramic materials.

20. The apparatus of claim 15 wherein the device operates at a pressure from 1 to 500 atmospheres.

21. The apparatus of claim 15 wherein the one or more plates are disposable.

* * * * *